United States Patent Office 2,784,233
Patented Mar. 5, 1957

2,784,233

TERTIARY N-(β,γ-DIOXYPROPYL)-AMINES AND METHODS OF MAKING THE SAME

August Kottler and Heinz Scheffler, Biberach (Riss), Germany, assignors to Dr. Karl Thomae G. m. b. H., Biberach (Riss), Germany, a corporation of Germany No Drawing. Application June 22, 1954,
Serial No. 438,610

Claims priority, application Germany June 26, 1953

1 Claim. (Cl. 260—584)

This invention relates to tertiary amines and in particular to novel tertiary N-(β,γ-dioxypropyl)-amines and their salts, and methods of making the same.

Long-chain tertiary amines are well known in the art. For example, U. S. Patents Nos. 1,836,047, 1,836,048, 2,541,088 and 2,541,089 disclose long-chain tertiary amines and processes for making them. The prior art also shows that amines of the type disclosed by the above-mentioned patents possess excellent wetting, cleaning, emulsifying and disinfecting properties. However, the practical application of such tertiary amines is rather limited because it was found that they have an irritating effect upon the human skin. Hence, they are unsuitable for use in the manufacture of compositions adapted for application to the human skin, such as cosmetics and pharmaceutical ointments, pastes and salves.

It is therefore an object of the present invention to provide novel teriary amines which are non-irritating to the human skin.

Another object of this invention is to provide tertiary N-(β,γ-dioxypropyl)-amines which are suitable for use in cosmetic and pharmaceutical preparations.

Still another object of this invention is to provide methods for producing tertiary N-(β,γ-dioxypropyl)-amines.

Other objects and advantages will become apparent as the description of this invention proceeds.

We have found that tertiary amines having the general structural formula

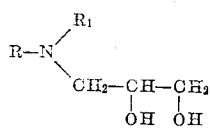

wherein R is an aliphatic radical comprising from 6 to 16 carbon atoms and R₁ is a hydrogen atom, or an aliphatic radical comprising from 1 to 5 carbon atoms, or an oxyalkyl radical or a dioxyalkyl radical comprising from 2 to 4 carbon atoms, or an aryl or aralkyl radical, and their salts, are non-irritating to the human skin and can be safely used in cosmetic and pharmaceutical preparations, or any other composition adapted to be brought into direct contact with the human skin.

The above tertiary N-(β,γ-dioxypropyl)-amines can be produced by reacting a primary or secondary amine having the general structural formula R—NH—R₁, wherein R and R₁ represent the above-indicated atoms or radicals, with glycidol or a glycerol-α-monohalogenhydrin. The reactions with a secondary amine can be illustrated as follows:

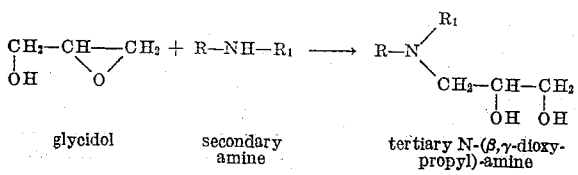

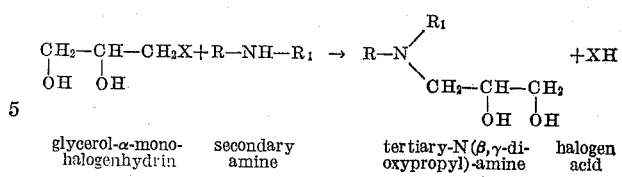

The reactions with a primary amine can be illustrated as follows:

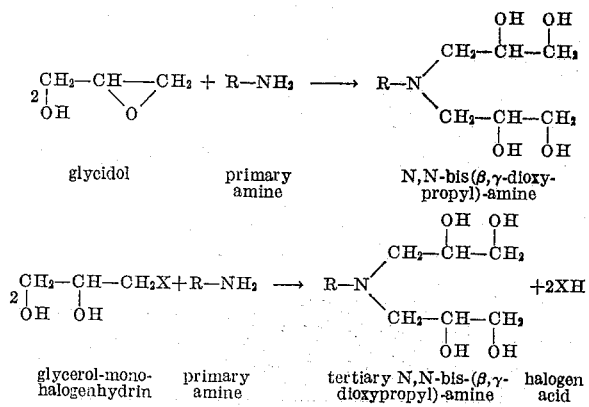

As illustrated above, the reaction between glycidol and the secondary amine takes place when the individual reactants are present in an equimolecular ratio. However, the glycidol may also be present in slight excess. If necessary, the reaction may be carried out in the presence of an inert solvent, such as an alcohol or acetone. The reaction proceeds at room temperature or at elevated temperatures.

The reaction between the secondary amine and the glycerol-α-monohalogenhydrin takes place preferably in the presence of an inert solvent, such as an alcohol or acetone, and in the presence of an acid-binding agent, such as an alkali metal carbonate. In this case, too, the reaction proceeds readily at room temperature or elevated temperatures.

The reaction between the primary amine and glycidol or the glycerol-α-monohalogenhydrin takes place with 2 mols of the glycol compound for each mol of amine, or also with a slight excess of the respective glycol compounds present. The conditions of this reaction are substantially similar to those stated for the reactions with the secondary amine; that is, glycidol or a glycerol-α-monohalogenhydrin may be reacted with a primary amine at room temperature or at elevated temperatures and in the presence of inert solvents and/or acid-binding agents as disclosed above.

The tertiary amines are recovered from the reactions carried out in accordance with the invention in good yields. They may be isolated from the reaction mass and purified by vacuum distillation and/or recrystallization.

The salts of these novel tertiary amines may be produced in any one of the many well-known ways. These salts have been found to be highly soluble in water, and their aqueous solutions foam very strongly.

The new compounds produced in accordance with our invention are excellent wetting, emulsifying, cleaning and disinfecting agents, especially in the form of their salts. Even at high concentrations they are non-irritating to the human skin. Therefore, they are well suited for use in the production of cosmetic and pharmaceutical preparations, in contrast to other long-chain tertiary amines.

As disinfecting agents, the tertiary amines of our invention have been found to possess a particularly high compatibility with albumin.

Our novel tertiary amines have also been found to be dissolving agents for a number of water-insoluble antimicrobic substances, which makes their application in the cosmetic and pharmaceutical industries even more desirable.

The following examples are given for the purpose of further illustrating our invention but without limiting the same thereto.

*Example I*

19.9 gm. (0.1 mol) N-methyldodecylamine were gradually admixed with 7.4 gm. (0.1 mol) glycidol, accompanied by centrifugal agitation. The mixture was heated to accelerate the reaction. After the reaction had subsided, the mass was heated for three additional hours on a water bath. The reaction mass was then distilled in a high vacuum and the reaction product, N-methyl-N-($\beta,\gamma$-dioxypropyl)-dodecylamine, was recovered. The yield was 22 gm., which is 81% of the theoretical yield. The boiling point of the reaction product was found to be 161 to 169° C. at a pressure of from 0.07 to 0.09 mm. of mercury.

The above reaction product was also prepared by reacting N-methyldodecylamine with glycerol-$\alpha$-monochlorohydrin in the presence of an alcohol solvent and sodium carbonate.

The chlorohydrate of this tertiary amine was found to have a melting point of 160° C.

Cl content of the chlorohydrate: Percent
    Calculated _____ 11.5
    Found _____ 11.8

*Example II*

19.9 gm. (0.1 mol) N-methyldodecylamine and 11.05 gm. (0.1 mol) glycerol-$\alpha$-monochlorohydrin were dissolved in 50 cc. of 95% ethylalcohol and this solution was boiled under reflux for 8 hours after adding 10.6 gm. (0.1 mol) anhydrous sodium carbonate. The precipitate formed was filtered off and the filtrate was freed from water by boiling. The residual filtrate was then distilled in a high vacuum. The reaction product, N-methyl-N-($\beta,\gamma$-dioxypropyl)-dodecylamine, was recovered. The yield was 20 gm., which is 73.5% of the theoretical yield. The recovered reaction product is identical to that recovered in Example I.

*Example III*

9.15 gm. (0.04 mol) N-($\beta$-oxyethyl)-dodecylamine were admixed with 2.96 gm. (0.04 mol) glycidol and the mixture was heated in a 100 cc. round-bottom flask for 6 hours at 120° C. The reaction mass was then directly distilled in a high vacuum. The reaction product, N-($\beta$-oxyethyl)-N-($\beta,\gamma$-dioxypropyl)-dodecylamine, was recovered. The yield was 9.1 gm., which is 75% of the theoretical yield. The boiling point of the reaction product was found to be 204–205° C. at a pressure of 0.09 mm. of mercury. After prolonged standing, the reaction product, a viscous oil, crystallized. Recrystallized from petroleum ether, it had a melting point of 44° C.

N content: Percent
    Calculated _____ 4.62
    Found _____ 4.53

*Example IV*

73 gm. (0.32 mol) N-($\beta$-oxyethyl)-dodecylamine and 35.2 gm. (0.32 mol) glycerol-$\alpha$-monochlorohydrin were dissolved in 160 cc. of 95% ethyl alcohol and 33.8 gm. (0.32 mol) anhydrous sodium carbonate were added to this solution. The solution was then boiled for 9 hours under reflux. The precipitate formed was filtered off and the filtrate was freed from water by boiling. The residual filtrate was then distilled in a high vacuum. The reaction product, N-($\beta$-oxyethyl)-($\beta,\gamma$-dioxypropyl)-dodecylamine, was recovered. The yield was 72.5 gm., which is 75% of the theoretical yield. The product is identical with that recovered in Example III.

*Example V*

9.25 gm. (0.05 mol) dodecylamine were gradually admixed with 7.48 gm. (0.1 mol) glycidol. A highly exothermic reaction took place immediately. The reaction mixture was therefore cooled with circulating cold water. The reaction mass was allowed to stand at room temperature for three hours after the reaction had subsided, and was then distilled in a high vacuum. The reaction product was found to be N,N-bis-($\beta,\gamma$-dioxypropyl)-dodecylamine. The yield was 10 gm., which is 62.5% of the theoretical yield. The boiling point of the reaction product was found to be 250° C. at a pressure of 0.1 mm. of mercury, and it was soluble in water.

N content: Percent
    Calculated _____ 4.2
    Found _____ 4.0

*Example VI*

22.7 gm. (0.1 mol) N-methyl-myristylamine were admixed with 7.4 gm. (0.1 mol) glycidol. The solution temperature rose during such admixture. The mixture was then heated to 100–120 C. for 2.5–3 hours and subsequently distilled in a vacuum. The reaction product recovered therefrom was N-methyl-N-($\beta,\gamma$-dioxypropyl)-myristylamine. The yield was 24 gm., which is 80% of the theoretical yield. The boiling point of this reaction product was found to be 166–170° C. at a pressure of 0.01–0.03 mm. of mercury.

The same reaction product was obtained by boiling a solution of N-methyl-myristylamine and glycerol-$\alpha$-monochlorohydrin in alcohol in the presence of sodium carbonate.

N content: Percent
    Calculated _____ 4.65
    Found _____ 4.70

*Example VII*

12.75 gm. (0.05 mol) N-methyl-cetylamine were admixed with 3.7 gm. (0.05 mol) glycidol. The temperature of this mixture rose to 50° C. The mixture was then heated to 100° C. for a few hours and subsequently distilled in a vacuum. The reaction product was found to be N-methyl-N-($\beta,\gamma$-dioxypropyl)-cetylamine. The yield was 13.0 gm., which is 78.8% of the theoretical yield. The boiling point of this reaction product was found to be 180–186° C. at a pressure of 0.01–0.03 mm. of mercury.

The same reaction product was obtained by reacting N-methyl-cetylamine and glycerol-$\alpha$-monochlorohydrin in the presence of alcohol as a solvent and sodium carbonate as the acid-binding agent.

N content: Percent
    Calculated _____ 5.41
    Found _____ 5.49

*Example VIII*

18.5 gm. (0.1 mol) N-n-butyl-n-octylamine were mixed with 7.4 gm. (0.1 mol) glycidol. The temperature of this mixture rose to 50° C. by itself. The mixture was heated for an additional few hours at 100° C. and subsequently distilled in a vacuum. The reaction product was found to be N-n-butyl-N-($\beta,\gamma$ dioxypropyl)-n-octaylamine. The yield was 24.5 gm., which is 94.6% of the theoretical yield. The boiling point of the reaction product was found to be 145–150° C. at a pressure of 0.02 to 0.03 mm. of mercury.

The same reaction product was obtained by reacting N-n-butyl-n-octylamine with glycerol-$\alpha$-monochlorohydrin in solution in alcohol in the presence of sodium carbonate.

N content: Percent
    Calculated _____ 4.25
    Found _____ 4.36

Example IX 17.3 gm. (0.1 mol) N-($\beta$-oxyethyl)-n-octylamine were admixed with 7.4 gm. (0.1 mol) glycidol. During this admixture the temperature of the mass rose to about 55° C. This mixture was then heated to 120° C. for another hour and subsequently distilled in a vacuum. The reaction product was found to be N-($\beta$-oxyethyl)-N-($\beta$,$\gamma$-dioxypropyl)-n-octylamine. The yield was 22.5 gm., which is 91% of the theoretical yield. The boiling point of this reaction product was found to be 160–165° C. at a pressure of 0.03 to 0.04 mm. of mercury.

The same reaction product was obtained by reacting N-($\beta$-oxyethyl)-n-octylamine with glycerol-$\alpha$-monochlorohydrin in the presence of an alkali.

N content: Percent
Calculated _____ 5.68
Found _____ 5.84

While we have illustrated certain preferred embodiments of our invention, it will be understood that various modifications and changes can be made without departing from the spirit of our invention or the scope of the following claim.

We claim:

N-($\beta$-oxyethyl)-N-($\beta$,$\gamma$-dioxypropyl)-dodecylamine.

References Cited in the file of this patent

UNITED STATES PATENTS

| | | |
|---|---|---|
| 2,042,621 | Olin | June 2, 1936 |
| 2,089,569 | Orthner et al. | Aug. 10, 1938 |
| 2,226,126 | De Groote et al. | Dec. 24, 1940 |
| 2,293,494 | De Groote et al. | Aug. 18, 1942 |

FOREIGN PATENTS

| | | |
|---|---|---|
| 358,114 | Great Britain | Oct. 5, 1931 |
| 107,510 | Germany | Mar. 16, 1899 |
| 84,899 | Sweden | Nov. 19, 1935 |

OTHER REFERENCES

Rider et al.: "Jour. Am. Chem. Soc." (1930), vol. 52, pp. 2115–8.